US010459785B2

(12) United States Patent
Dusija et al.

(10) Patent No.: US 10,459,785 B2
(45) Date of Patent: Oct. 29, 2019

(54) ERROR DETECTION FOR TRAINING NON-VOLATILE MEMORIES

(71) Applicant: Western Digital Technologies, Inc., San Jose, CA (US)

(72) Inventors: Gautam Ashok Dusija, Burlingame, CA (US); Venkatesh Prasa Ramachandra, San Jose, CA (US); Mrinal Kochar, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 59 days.

(21) Appl. No.: 15/717,572

(22) Filed: Sep. 27, 2017

(65) Prior Publication Data

US 2019/0095275 A1 Mar. 28, 2019

(51) Int. Cl.
*G06F 11/10* (2006.01)
*G06F 3/06* (2006.01)

(52) U.S. Cl.
CPC .......... *G06F 11/1004* (2013.01); *G06F 3/064* (2013.01); *G06F 3/0619* (2013.01); *G06F 3/0679* (2013.01)

(58) Field of Classification Search
CPC ............. G06F 11/1068; G06F 11/1072; G06F 11/0772; G06F 3/0619; G06F 3/0629; G06F 3/0604; G06F 3/067; G06F 11/1004; G06F 3/0679; G06F 3/064; G11C 29/52; G11C 29/021
See application file for complete search history.

(56) References Cited

U.S. PATENT DOCUMENTS

| 7,587,625 | B2 | 9/2009 | Alexamder et al. |
| 8,452,919 | B2 | 5/2013 | Kim et al. |
| 8,631,311 | B1 | 1/2014 | Chan et al. |
| 8,775,858 | B2 | 7/2014 | Gower et al. |
| 8,874,973 | B2 | 10/2014 | Hunt et al. |
| 9,384,128 | B2 | 7/2016 | Tuers et al. |
| 2007/0011562 | A1 | 1/2007 | Alexander et al. |
| 2009/0183051 | A1* | 7/2009 | Balb .................. G06F 11/1004 714/758 |

(Continued)

OTHER PUBLICATIONS

ATMEL 8-bit AVR RISC Microcontroller Application Note, AVR236: CRC Check of Program Memory; http://www.atmel.com/images/doc1143.pdf; 1143B—AVR—04/02; 10 pages, 2002.

*Primary Examiner* — Shelly A Chase
(74) *Attorney, Agent, or Firm* — Loza & Loza, LLP; Gabriel Fitch (57) ABSTRACT

The present disclosure, in various embodiments, describes technologies and techniques for detecting errors in a non-volatile memory (NVM) device prior to performing re-training/recalibration. A processing device in a NVM controller detects a cyclic redundancy check (CRC) condition for detecting error in the NVM device, and a re-training condition that is based on the CRC condition. A CRC circuit generates CRC code when a CRC condition is detected, and the processing is configured to compare CRC code received from the NVM controller with the generated CRC code to detect error. A calibration circuit then re-trains the NVM device if the CRC circuit detects error and the re-training condition has been met.

23 Claims, 5 Drawing Sheets

(56) References Cited

U.S. PATENT DOCUMENTS

| | | | |
|---|---|---|---|
| 2013/0007562 A1* | 1/2013 | Fai | G06F 11/1004 |
| | | | 714/758 |
| 2013/0117635 A1* | 5/2013 | Ok | G11C 29/021 |
| | | | 714/773 |
| 2016/0132379 A1* | 5/2016 | Chen | G06F 11/0772 |
| | | | 714/54 |
| 2016/0239235 A1* | 8/2016 | Chung | G06F 3/0629 |
| 2018/0159560 A1* | 6/2018 | Sharon | G06F 3/0619 |
| 2018/0341415 A1* | 11/2018 | Koudele | G06F 3/0619 |

* cited by examiner

ERROR DETECTION FOR TRAINING NON-VOLATILE MEMORIES

FIELD

The present disclosure, in various embodiments, relates to non-volatile memories (NVM) and/or associated memory controllers. More specifically, the present disclosure relates to the detection of errors in NVM for the purposes of training and calibrating NVMs.

BACKGROUND

In a variety of consumer electronics and computers, solid state data storage devices incorporating non-volatile memories (NVMs) are frequently replacing or supplementing conventional rotating hard disk drives for mass storage. As NVM speed and complexity increases, the need becomes greater for improved error correction and training of NVMs and NVM interfaces.

The use of error correction for memories, such as cyclic redundancy check (CRC), is known in the art and has been particularly useful for volatile memories, such as dynamic random access memory (DRAM). However, a number of limitations and drawbacks exist for implementing existing CRC techniques for NVM technologies. One such limitation is that CRC may introduce substantial latency in a memory circuit. While CRC is typically performed on every DRAM read operation, using such a configuration for NVMs may significantly slow down memory operations. Additionally, unlike DRAM technologies, which typically operate using either high-speed or zero-speed data transfer rates, NVM technology is typically configured to operate at a wide range of speeds and is typically configured to be backward compatible for lower-speed transfer rates.

In addition, NVMs are currently equipped with NVM controllers that are operative to "train" or calibrate the NVM and/or NVM interfaces to detect and/or minimize data errors. While NVM training is effective at calibrating NVM circuitry and implementing error correction, such training is also computationally expensive, and can require complex circuitry. Accordingly, there is a need in the art to develop error detection technologies and techniques for NVM that minimizes latency and complexity.

SUMMARY

One embodiment of the present disclosure provides non-volatile memory (NVM) controller, comprising a host interface for communicating with a host device and a memory interface for communicating to a NVM device via one or more channels. The NVM controller may also include a cyclic redundancy check (CRC) circuit for generating CRC code and a calibration circuit for providing re-training data to the NVM device. The NVM controller is also configured to (i) receive CRC code from the NVM device via the memory interface, (ii) compare the received CRC code with the generated CRC code to detect error, (iii) determine if a re-training condition has been met, based on the comparing of the received CRC code with the generated CRC code, and (iv) activate the calibration circuit to re-train the NVM device if the re-training condition has been met.

Another embodiment of the present disclosure provides a NVM controller, configured to communicate with a host and a NVM device, comprising a processing device for detecting a CRC condition for detecting error in the NVM device, and a re-training condition that is based on the CRC condition. The NVM controller further includes a CRC circuit operatively coupled to the processing device to generate CRC code when a CRC condition is detected, wherein the processor is configured to compare CRC code received from the NVM controller with the generated CRC code to detect error. The NVM controller further includes a calibration circuit, operatively coupled to the processor, to re-train the NVM device if the CRC circuit detects error and the re-training condition has been met.

Another embodiment of the present disclosure provides a method of operating a non-volatile memory (NVM) controller, configured to communicate with a host and a NVM device. The method includes detecting, in a processing device, a cyclic redundancy check (CRC) condition for detecting error in the NVM device and a re-training condition that is based on the CRC condition. The method further includes generating CRC code comprising a fixed-length binary sequence, via a CRC circuit, when a CRC condition is detected and comparing, via the processing device, fixed-length binary sequence CRC code received from the NVM controller with the generated CRC code to detect error. The method further includes re-training, via a calibration circuit, the NVM device if the CRC circuit detects error and the re-training condition has been met.

Another embodiment of the present disclosure provides a NVM controller, configured to communicate with a host and a NVM device, comprising means for detecting a cyclic redundancy check (CRC) condition for detecting error in the NVM device, and means for detecting a re-training condition that is based on the CRC condition. The NVM controller may further comprise means for generating CRC code when a CRC condition is detected, and means for comparing CRC code received from the NVM controller with the generated CRC code to detect error. The NVM controller may further include means for re-training the NVM device if the CRC circuit detects error and the re-training condition has been met.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Aspects of the present disclosure provide various apparatus, devices, systems and methods for determining an error condition for a NVM prior to initiating a training procedure for the NVM device. While the present disclosure will focus primarily on NAND memory technology, it should be understood by those skilled in the art that the teachings contained herein are equally applicable to other similar forms of NVM that may require training or calibration. Further, it should be understood that the terms "training" and "calibrating" are intended to be synonymous for the purposes of the present disclosure.

Additionally, it will be understood that the term "module" as used herein does not limit the functionality to particular physical modules, but may include any number of software and/or hardware components and/or circuits embodied in a tangible medium. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like.

Figure 1:
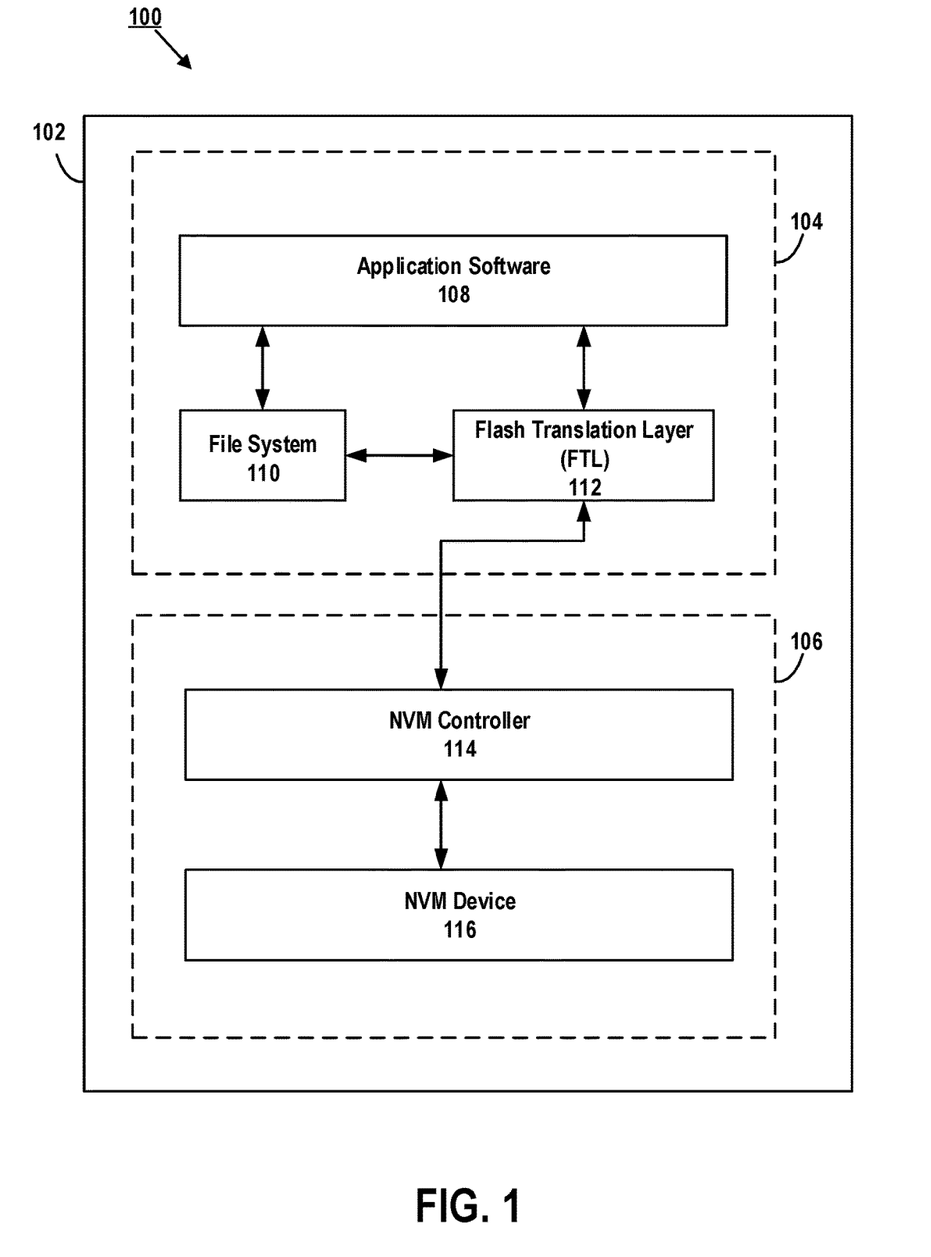
FIG. 1 shows a schematic block diagram configuration for software and hardware components for a NVM memory device under one exemplary embodiment.

FIG. 1 shows a schematic block diagram configuration 100 for software and hardware components for a NVM memory device under one exemplary embodiment. In this example, the NVM memory device 102 is illustrated as a NAND flash memory (also referred to as a "NAND device"). Generally speaking, NAND Flash is a non-volatile memory having high storage density, fast access time, low power requirements in operation and advantageous shock resistance, compared to more conventional memory platforms. Raw NAND Flash devices may be equipped with a serial interface such as Open NAND Flash Interface (ONFi), Common Flash Memory Interface (CFI), and the like. NAND Flash devices may be configured as discrete memory chips, or packaged with a controller to form SD memory card, Multi Media Card (MMC) or solid state disk (SSD). SSD and MMC cards are both widely used in consumer applications. For embedded applications, memory device 102 may be configured using raw NAND Flash devices, Secure Digital (SD) or MMC memory. Memory device 102 may be configured as a single chip device that integrates both an MMC controller function with NAND Flash memory array utilizing an embedded Multi-Media Controller (eMMC). Memory device 102 me be configured having a single flash die, or a plurality of dies.

In some illustrative embodiments, memory device 102 is shown having a software operating environment 104 and hardware operating environment 106. Software operating environment 104 may include application software 108, file system 110 and flash transfer layer (FTL) 112. Application software 108 may include an operating system, as well as any flash-based applications suitable for memory device 102. File system 110 may be configured as a file system designed for storing files on flash memory-based storage devices. In general, while the flash file systems are closely related to file systems, they should be optimized for the nature and characteristics of flash memory (such as to avoid write amplification), and for use in particular operating systems. FTL 112 may be configured as a logical-to-physical translation unit to translate logical addresses, e.g., logical block addresses (LBAs), to physical addresses, e.g., physical block addresses, of the memory device 102 during reading or writing data. FTL 112 may accesses a map in the flash translation layer when converting logical addresses to physical addresses so that data requested by a host system with a logical address can be properly physically addressed within memory device 102. FTL 112 may be configured with additional modules such as a NAND management unit to provide wear leveling, bad block mapping, garbage collection, and read scrubbing.

Wear leveling is a technique that may be utilized to compensate for the fact that a limited number of write operations can ultimately be performed on each NAND data storage element (i.e., block). Wear leveling may comprise periodically moving data between NAND data storage blocks in order to even out or "level" the number of times write operations are performed for each data storage block. Bad block mapping is a technique for marking blocks as being "bad" after it is discovered that such blocks are unreliable. Blocks marked as bad are subsequently not written to or read from. Garbage collection is a technique whereby valid pages within a block are copied to a new block so that a source block can be erased. Garbage collection may be required in NAND memory because the unit of writing is a page, and the unit of erasure is a block. Accordingly, if a command to write data targets an existing page, then the data of the existing page is not actually modified. Instead, a new page is written and the old page is marked as invalid. As a result, the number of invalid pages continue to grow and garbage collection becomes necessary to free up blocks having a large number of invalid pages. Read scrubbing is a technique whereby a controller (e.g., NVM controller 114) periodically reads data in the non-volatile semiconductor memory (e.g., memory device 116), performs error checking operations on the data to determine if there are errors, corrects errors that are found, and then writes the error-corrected data back to the same location. This technique helps to reduce the amount of errors experienced when reading data out from the non-volatile semiconductor memory. Read scrubbing may be performed as part of the training process, described herein, and may be initiated via a host (e.g., 320) and/or a NVM controller (e.g., 114, 302). In one aspect, NVM controller 114 may be configured to perform any of the processes described herein for detecting CRC errors and re-calibrating characteristics of the interface between the NVM device 116 and NVM controller 114, such as re-training the NVM controller 114.

Figure 2:
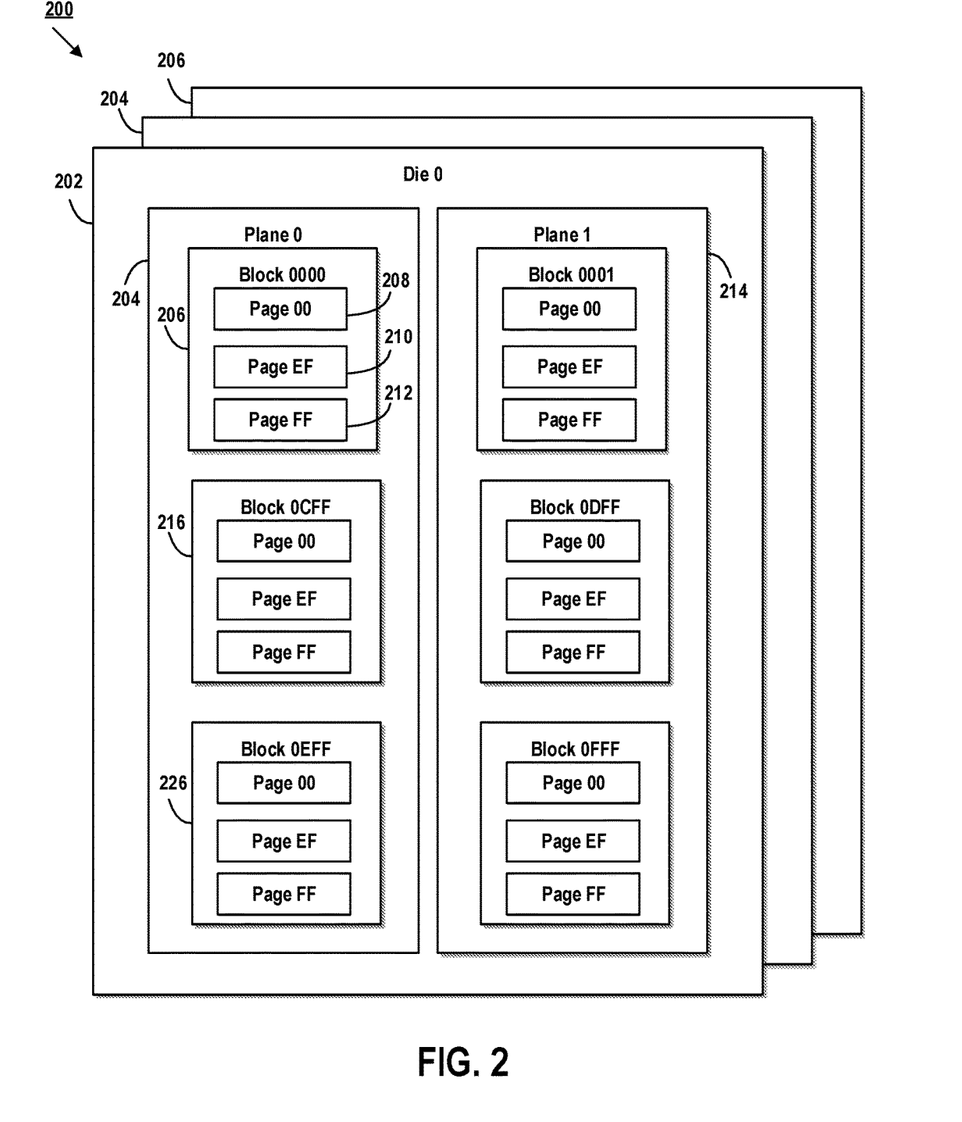
FIG. 2 shows an illustrative memory structure package for a NVM chip including one or more dies, planes, blocks and pages under an illustrative embodiment.

Turning now to FIG. 2, an illustrative memory structure package 200 is shown for a NVM chip (e.g., 102) including one or more dies 202-206, planes 204, 214, blocks 206, 216, 226 and pages 208, 210, 212 under an illustrative embodiment. It should be understood by those skilled in the art that the example of FIG. 2 is simplified, for the purposes of understanding the underlying technology of the present disclosure, and that additional and/or alternative features may be incorporated. In this example, the memory structure package 200 may be configured into one or more dies 202-206 (or "crystals") that make up a memory package. The die (202-206) may be configured as the smallest unit that can independently execute commands or report status. Each die nay include one or more planes (204, 214) wherein identical, concurrent operations can take place on each plane. Each plane 204, 214 may include a number of blocks 206, 216, 226, which generally are the smallest unit that can be erased. Each block 206, 216, 226 may include a number of pages 208, 210, 212, which are generally the smallest unit that can be programmed.

For a read operation, a two-step process may be performed in order to read data from NVM memory, such as NAND Flash pages. First, in one example, the page may be opened for read (e.g., as a result of a read command). After a page is opened, a portion of, or all the data from the page is transferred internally to shift registers (not shown) inside the NAND Flash, ready to be transferred to the external interface. Data can then be shifted out sequentially from the NAND device one byte at a time. Data transfer typically takes from 20 to 100 nanoseconds (ns) per byte for asynchronous device. Synchronous device are much faster with 5 to 25 ns transfer time per byte. Data is typically read sequentially from within a page (e.g., 208). To support random access, NAND Flash devices allows user to change the read address within the page once the page is opened.

To store data into NAND flash, a similar two-step process may be implemented. Data may be first shifted into the shift registers of the NAND Flash device. After a portion of, or all the data of the page has shifted in, the user may issue a program command to direct the data from the data registers to be programmed into the specific page. Typical programming time is a few hundred microseconds per page for SLC and a few milliseconds for MLC. Variations such as two plane programming, cache programming and random programming may be supported by NAND Flash devices to reduce programming time. In some illustrative embodiments, a page may be erased by an erase command before new data is written to the page. In one example, an erase command sets all data bits to "1". During programming, either "1" or "0" can be written into each cell. After a "0" has been written to a cell, the cell may be configured so that it cannot be changed back to "1" again with another write, and requires an erase command to change the cell back to "1". The effect of this exemplary configuration is that the data stored in each cell may be configured as the logical "AND" of the new (write data) and the existing data.

Interleaving techniques may also be used for read/write access to reduce the overall access time for a device and to improve performance. NAND Flash devices that features two planes may be configured to support interleave read and interleave write. In interleave read, the NAND Flash allows a page in the second plane to be opened while data of a page in the first plane is being transferred. In interleave write, the NAND Flash device allows two pages from opposite planes to be programmed at the same time. Thus, there is only one program time overhead for two pages of data, program time reduced by half. In one aspect, the memory structure package 200 can store instructions for a processor (such as one contained in NVM controller 114) for performing any of the processes described herein for detecting CRC errors and re-calibrating characteristics of the interface between the NVM device 116 and NVM controller 114, such as re-training the NVM controller 114.

Figure 3:
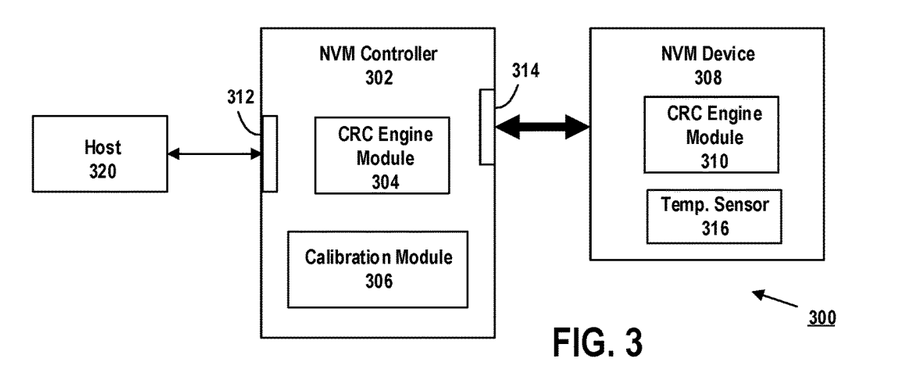
FIG. 3 shows one configuration for a NVM controller operatively coupled to a NVM memory, wherein the controller includes a CRC engine and a calibration circuit communicable to a NVM flash memory that includes a CRC engine under an illustrative embodiment.

Turning to FIG. 3, the drawing illustrates an embodiment of a NVM memory system 300 that includes a NVM controller 302 that communicates over one or more channels via a memory interface 314 with to a NVM device 308. The embodiment of FIG. 3 may include the configuration described previously in connection with the embodiments of FIGS. 1-2, described above. NVM controller 302 may also be configured to communicate with a host device 320 via host interface 312. For the purposes of explanation only, the NVM memory system 300 (as well as system 400) will be described in further detail below in the context of a NAND memory system. Thus, NVM controller 302 and NVM device 308 are referred to as "NAND controller" 302 and "NAND device" 308, respectfully. Again, those skilled in the art will recognize that the teachings of FIG. 3 and FIG. 4 (discussed below) are equally applicable to other suitable NVM systems and devices.

Because of complexities relating to the operation of NAND devices, a NAND controller (302) may be advantageously used for controlling the use of a NAND device (e.g., 308) in an electronic system. While it is possible to operate and use a NAND device directly by a host device (320) with no intervening NAND controller, this architecture is not preferred for a number of reasons. First, the host has to individually manipulate each one of the NAND device's control signals (e.g. command latch enable (CLE) or address latch enable (ALE)), which is cumbersome and time-consuming for the host. Second, the support of Error Detection Codes (EDC) and Error Correction Codes (ECC) puts a severe burden on the host-parity bits have to be calculated for each page written, and error detection calculations (and sometimes error correction calculations) may be performed by the host. All this makes such an architecture relatively slow and inefficient.

NAND controller 302 may be utilized to significantly simplify the host's 320 tasks when using the NAND device. The processor of host 320 may interact with the controller 302 via a host interface 312 using a protocol that is much more convenient to use, where a request for writing a page may be sent as a single command code followed by address and data, instead of having to undergo complex sequencing of control lines and NAND command codes. The controller then converts the host-controller protocol into the equivalent NAND protocol sequences, while the host is free to do other tasks (or just to wait for the NAND operation to complete, if so desired).

The NAND controller 302 may be configured to reside within the system in a number of ways. One way would be to configure the NAND controller 302 to be physically located within the host processor of a host device (e.g., 320). If the host processor is implemented as a single die, then the controller 320 may be incorporated on the same die. This technique is used, for example, in Open Multimedia Applications Platform (OMAP) processors known in the art. In a system built using this architecture, the host processor typically interacts with the NAND controller using a proprietary protocol, as the interaction is internal to the host processor and there is no benefit in using a standard protocol.

Alternately or in addition, NAND controller 302 may be configured as a separate physical element, residing between the host processor of the host 320 and the NAND device 308. This technique is used, for example, in portable USB Flash Drives (UFDs), where NAND controller 302 may be packaged inside the UFD and interacting using a device side NAND interface with the NAND device 308 on one side and with the host processor 320 on the other side (e.g., using a host side USB interface which uses the USB protocol). In a system built using this architecture the host processor typically interacts with the NAND controller using a standard protocol such as USB or ATA, as the interaction is external to the processor and it is more convenient to use standard protocols that are already supported by the processor for other purposes.

Alternately or in addition, NAND controller 302 may be physically located within the NAND device 308. The flash device and the controller may even be implemented on the same die. This is for example the case in some of Mobile Disk-On-Chip (mDOC) storages devices and/or in OneNAND devices. In a system built using this architecture the host processor 320 typically interacts with the NAND controller 302 using either a standard protocol such as USB or a semi-standard protocol as is the case in the MDOC and OneNAND examples mentioned above.

Continuing with the example of FIG. 3, controller 302 may include a CRC engine module 304 and calibration circuit 306 that may be embodied on a processing device 330 to form a programmable calibration circuit. Accordingly, reference to "modules" and "circuits" in the present disclosure are intended to be synonymous. Processing device 330 may include one or more processing circuits and/or controllers for carrying out controller 302 functions. In some illustrative embodiments, CRC engine circuit 304 and calibration circuit 306 may be embodied on separate processing circuits. In some illustrative embodiments, processing device 330 may include one or memories to store data.

In some illustrative embodiments, CRC engine 304 is correlated with a CRC Engine 310 in the NAND device 308. CRC engine 304 may be configured to calculate a short, fixed-length binary sequence (i.e., check value or CRC) for each block of data to be sent or stored and appends it to the data, forming a codeword. When a codeword is received or read by the controller 302, it either compares its check value with one freshly calculated from the data block, or equivalently, performs a CRC on the whole codeword and compares the resulting check value with an expected residue constant. If the CRC check values do not match, then the block is determined to contain a data error. CRC engines 304, 310 may be configured to use any suitable CRC algorithm, such as Hamming codes, using single error correction double error correction, or other techniques known in the art.

In some illustrative embodiments, the controller 302 may issue a predetermined transfer operation (e.g., 0x"XX"), where a fixed data transfer size (e.g., 4 kB, up to physical page size) is used for the CRC on the controller 302 and NAND device 308 side. When the transfer operation is received by NAND device 308, the CRC engine 310 of the NAND device 308 transfers out the page, and the NAND device may toggle out extra bytes of CRC over the requested data. The CRC engine module 304 may then process the CRC data from engine module 310 to determine if the data matches. In one example, while receiving the requested data, the controller 302 may activate CRC engine 304 to generate CRC concurrently ("on the fly"), allowing the controller 302 to skip NAND device 308 CRC bytes. In some illustrative embodiments, CRC data may be generated during a read operation.

Under some illustrative embodiments, CRC engine module 304 is configured to activate upon the presence of a CRC condition that may be preset in the CRC engine module 304, or provided by NAND controller 302 (and/or host 320). For the purposes of the present disclosure, a "CRC condition" may be defined as one or more states that cause the controller CRC engine module 304 to perform a CRC on NAND device 308. For example, a CRC condition may include, but is not limited to, a predetermined or random measure of time or a temperature delta (difference) on the NAND device 308 (e.g., an increase of temperature by 10 degrees detected by temperature sensors 316 and/or 410). Other examples may include various combinations of CRC conditions. As one example, CRC engine 304 may be configured to perform CRC at a first predetermined time, and, when a CRC returns an error, the CRC engine 304 may perform follow-up CRC based on a second predetermined period of time. As another example, CRC engine 304 may be configured to perform CRC at a first predetermined time, and, when a temperature delta threshold (e.g., detected by temperature sensor 316) has been met or exceeded, the CRC engine 304 may perform follow-up CRC based on a second predetermined period of time. One skilled in the art will recognize that a variety of different CRC conditions may be configured based on the application needs for the NAND memory system (e.g., 300).

It is important to note that the CRC performed by controller 302 in the example of FIG. 3 is not merely use to detect specific errors in the NAND device 308, but is also used as a basis for re-training (recalibrating) NAND device 308 via calibration circuit 306. For reasons discussed above, the re-training process for NAND device 308 is computationally expensive and introduces latency into the NAND memory system 300. Accordingly, the NAND memory system 300 may be configured to withhold engagement of the re-training process until a CRC error is detected in CRC engine module 304. In some illustrative embodiments, the calibration circuit 306 may utilize data from the CRC condition to initiate re-training. For example, calibration circuit 306 may not initiate re-training of NAND device 308 until a predetermined number of CRC errors are received within a predetermined time period. As another example, calibration circuit 306 may not initiate re-training until a temperature delta threshold has been met or exceeded and a CRC error is detected. Again, those skilled in the art will recognize that a variety of different re-training conditions may be configured based on the application needs for the NAND memory system (e.g., 300).

Due to production yield constraints, NAND devices sometimes ship with a number of bad blocks that are not to be used. Typically, before a NAND is placed into operation, the NAND device is calibrated utilizing a signal input that sets an output buffer impedance and the operating mode (e.g., ZQ Calibration Long (ZQCL)). As NAND devices require a serialized data interface, execute-in-place functionality typically cannot be implemented. Moreover, with repeated usage and after multiple erase cycles, the memory will tend to "wear" and become less reliable. As such, the bits stored in the chip can sometimes flip from 1 to 0 or vice versa. In other cases, voltage and temperature variations in the memory may introduce impedance errors and clock drifts. In such cases, re-training is required (e.g., ZQ Calibration Short (ZQCS)) to recalibrate the NAND device. Typically, during a re-training process (e.g., during ZQCS operation), no array operations may be allowed on the NAND device that is performing the ZQCS operation. Array operations may be allowed on other NAND devices that share the ZQ signal with the NAND device that is performing the ZQCS operation. Generally speaking, in order to re-train a NAND device, the NAND controller (e.g., 302) may perform impedance matching to match the NAND device (e.g., 308) impedance to the controller (e.g., 302), followed by a calibration of the duty cycle for the controller (e.g., 302) and the NAND device. The controller (e.g., 302) may then train the clock to match that of the NAND device 308. Further details of training and/or retraining techniques are described in the Open NAND Flash Interface Specification, Revision 4.0 (Apr. 2, 2014), and "NAND Flash Interface Interoperability", JESD230B (July 2014).

In an illustrative embodiment, calibration software and data for NAND device 308 may be initially stored on a memory (not shown) of controller 302 and executed to perform initial training/calibration. The controller 302 may designate one or more channels to communicate (e.g., via interface 314) between NAND controller 302 and NAND device 308 in which to write calibration data to one or more addresses of the NAND device 308. After the calibration data has been written, the controller 302 may be configured to adjust the timing of the strobe (e.g., clock signal between the controller 302 and the NAND device 308). In one example, a read command may be issued on the designated channel(s), in order to read the calibration data written to the NAND device 308. Based on the read data, controller 302 may perform a correction process to achieve calibration. In one example, controller 302 may adjusts the timing of the strobe, or corrects the phase relationship between data and the strobe (e.g., via delay-locked loop). When the correction(s) associated with all channels designated are completed, the re-training may be terminated.

In some illustrative embodiments, calibration data and/or calibration-related data (e.g., data indicating the impact of a calibration process) may be stored on either or both of a NVM (e.g., NAND device 308) and/or a NVM controller (e.g., NAND controller 302). For example, when the NAND controller (e.g., 302) performs impedance matching to match the NAND device (e.g., 308) impedance to the controller (e.g., 302), the final impact of the tuning (e.g., tuned impedance information such as matching impedance) may be stored on the NVM and/or on the controller to allow the NVM impedance to match the controller. Duty cycle correction impact data (e.g., corrected duty cycle information) may be stored on the NVM, while strobe adjustment may be performed and stored on the controller to match the NVM. In one example for tuning the strobe, a data pattern may be transmitted or written to the NVM and then read back to match phase and to ensure that communication channels are free of signal integrity errors.

In one aspect, processing device 330 of NVM controller 302, alone or in combination with host 320, may be specifically programmed to act as a means for determining a CRC condition for detecting error in the NVM, generating CRC code when the CRC condition is determined, means for comparing CRC code received from the NVM controller with the generated CRC code to detect error, means for determining if a re-training condition has been met, if the comparing the CRC code detects error, and means for re-training the NVM if the means for comparing CRC code detects error and the re-training condition has been met.

Figure 4:
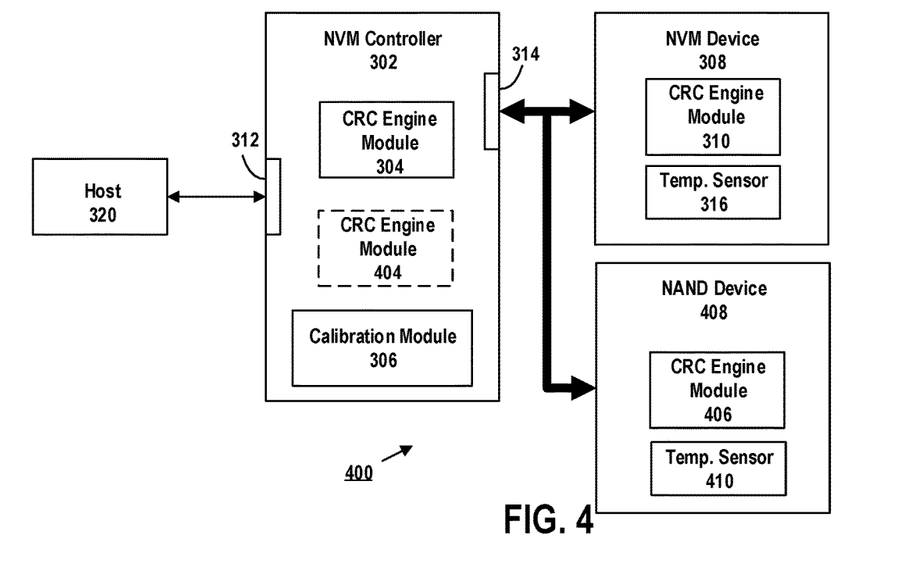
FIG. 4 shows one configuration for a NVM controller operatively coupled to a plurality of NVM memories, wherein the controller includes one or more CRC engines and a calibration circuit communicable to the plurality of NVM flash memories where each may include a CRC engine under an illustrative embodiment.

Turning now to FIG. 4, the drawing illustrates an embodiment of a NVM memory system 400 that includes a NVM controller 302 that communicates over one or more channels with NVM device 308 and NVM device 408. As in the example of FIG. 4, the embodiment of FIG. 4 will be described in the context of a NAND system and may include components similar to those discussed above in connection with FIG. 3. These components are designated with the same reference numerals and should be interpreted as having the same or similar features and/or functions as those described previously. Unlike the embodiment in FIG. 3, the NAND memory system 400 in this example communicates with a plurality of NAND devices (308, 408). Here, the CRC engine 304 may be configured to perform CRC separately and independently with each CRC engine (310, 406) of each respective NAND device (308, 408). Under this configuration, CRC engine 304 may perform each CRC serially, based on each respective CRC condition.

In this example, the CRC algorithms and conditions may be configured separately to avoid conflicts between data communicated as a result of the CRC (e.g., receiving CRC results simultaneously for both NAND devices). In some illustrative embodiments, each CRC engine module (304, 404) may be configured to handle CRC from each respective NAND device (308, 408). Thus, CRC engine module 304 may be tasked with communicating with CRC engine module 310 of NAND device 408, and CRC engine module 404 may be tasked with communicating with CRC engine 406 of NAND device 408. Using this configuration, each paired CRC engine (304 with 310, 404 with 406) may operate independently and in parallel under each respective CRC condition, without the risk of conflict. Using the configurations of FIGS. 3 and/or 4, the memory system may be able to determine if errors or malfunctions exist in the channel, the host data or both.

Figure 5:
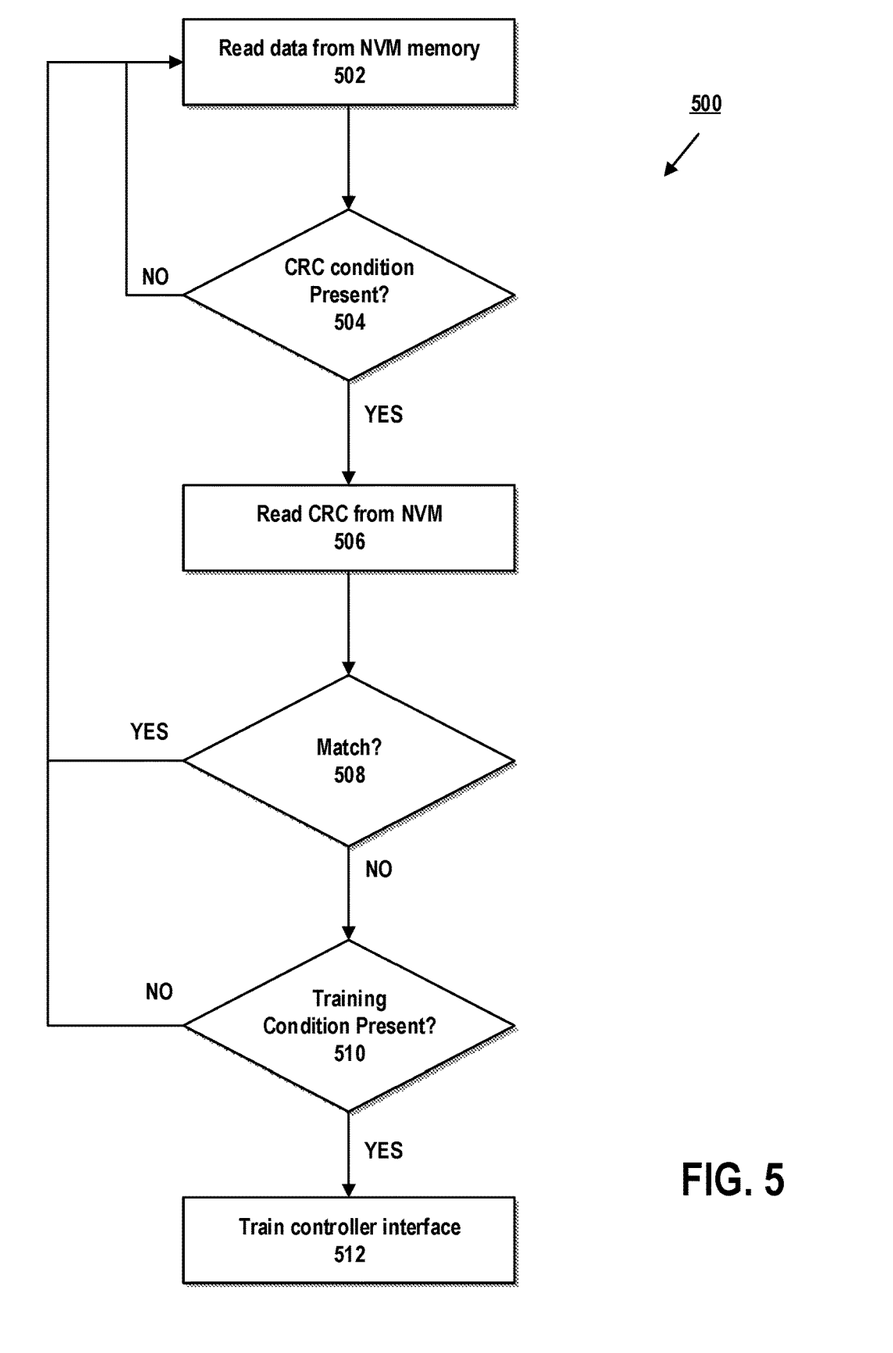
FIG. 5 shows a process for a NVM controller to determine if a CRC condition is present for a NVM memory and read CRC data in response thereto, where, if there is no CRC match and a training condition is present, the NVM controller initiates training of the NVM memory under an illustrative embodiment.

FIG. 5 shows a process 500 for a memory system controller (e.g., 302) to determine if a CRC condition and/or a read error condition is present for a NVM and read CRC data in response thereto, where, if there is no CRC match and a re-training condition is present, the NVM controller initiates training of the NVM memory under an illustrative embodiment. In block 502, data from memory (e.g., NAND device 308) is read via the controller (e.g., 302) during a normal course of operation. In decision block 504, the system determines is a CRC condition is present. As discussed above, a CRC condition may include a time period, temperature delta, or the like. If not ("NO"), the process continues to read data from memory in block 502.

IF a CRC condition is present ("YES"), the process continues to block 506 where a CRC, such as described above in connection with FIGS. 3-4, is performed on the NVM. If the CRC passes and there is a match ("YES"), the process moves back to block 502 wherein data continues to be read from NVM memory in the normal course of operation. If the CRC fails and there is no match ("NO"), the process moves to decision block 510, where the system determines if a re-training condition is present. As discussed above, an example of a re-training condition may include a predetermined number of CRC fails, or a CRC fail occurring during a predetermined temperature delta. If a re-training condition is not present ("NO"), the process proceeds back to block 502, wherein data continues to be read from NVM memory in the normal course of operation. If the re-training condition is present ("YES"), the memory controller (and/or a host) may initiate re-training to calibrate the NVM, as discussed in greater detail above.

Figure 6:
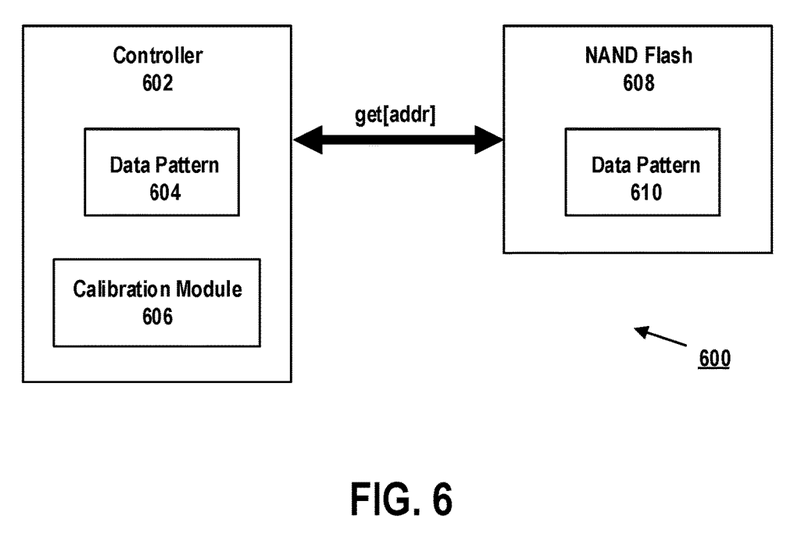
FIG. 6 shows a schematic block diagram of a NVM controller communicatively coupled to a NVM memory for reading one or more data patterns to detect errors for initiating a training procedure under an illustrative embodiment.

FIG. 6 shows a schematic block diagram of a memory system 600 having a NVM controller 602 communicatively coupled to a NVM device 608 (e.g., NAND memory) for reading one or more data patterns to detect errors for initiating a training procedure. In this example, the operation of memory system 600 may be similar to that of systems 300 and 400 discussed above, except that controller 602 and NVM device 608 are equipped with data pattern modules 604, 610. The data pattern modules 610 and 604 may be configured to generate predetermined data patterns (e.g., more than 4 bytes), where controller 602 may issue a get command (e.g., 0x"XX") to retrieve the preset data pattern from module 610. When received, the controller 602 compares the data pattern retrieved from module 610 with the data pattern in module 604, and, if the data pattern does not match, calibration circuit 606 is activated to perform re-calibration on NVM device 608. The re-calibration (or re-training) may be performed similarly to that discussed above in connection with FIGS. 3-4, calibration circuit 306.

Generally speaking, the CRC code of FIG. 3 may be generated on host data written to a NVM device that is calculated over a relatively larger number of bytes (e.g., 4 kB to page size), while the data patterns of FIG. 6 may be configured as smaller data sizes (e.g., 16 bytes) that may be repeated as many times as needed to complete calibration. The CRC code of FIG. 3 and the data patterns of FIG. 6 may both be considered synonymous "CRC code" for the purposes of the present disclosure. In some illustrative embodiments, the configuration of FIG. 6 may be used after a read error is detected and/or may be used periodically to test for error. In some illustrative embodiments, the data patterns of FIG. 6 may be utilized as an addition or alternative to CRC code, where such data patterns may be used to determine error over different (e.g., shorter) time periods compared to CRC. Because the data patterns utilize a smaller data "footprint" compared to CRC code, the data patterns may detect error and invoke calibration before CRC code is utilized or required. Of course, the embodiments disclosed herein may be modified suit a particular need or application. For example, a system may negate the use of CRC codes if the data patterns detect error and calibration is successfully performed. In another example, the system may require that both the data pattern and CRC code tests fail before invoking calibration. Those skilled in the art should recognize that multiple modifications may be performed to the present disclosure to suit a particular test.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A non-volatile memory (NVM) controller, comprising:
 a host interface for communicating with a host device;
 a memory interface for communicating with a NVM via one or more channels;
 a cyclic redundancy check (CRC) circuit configured to generate a CRC code; and
 a calibration circuit configured to provide re-training data to the NVM,
 wherein the NVM controller is configured to:
  (i) receive a CRC code from the NVM via the memory interface,
  (ii) compare the received CRC code with the generated CRC code to detect error,
  (iii) determine if a re-training condition has been met, based on the comparison of the received CRC code with the generated CRC code, and
  (iv) activate the calibration circuit, if the re-training condition has been met, to re-train the NVM using the re-training data.

2. The NVM controller of claim 1, wherein the NVM comprises a NAND memory, and the NVM controller is configured to receive the CRC code in response to a read command.

3. The NVM controller of claim 1, wherein the NVM controller is further configured to:
determine if a CRC condition is present, and
receive CRC code from the NVM only if the CRC condition is present.

4. The NVM controller of claim 3, wherein the CRC condition comprises at least one of (i) expiration of a predetermined period of time, (ii) a predetermined number of read errors detected, and/or (iii) a temperature delta detected.

5. The NVM controller of claim 1, wherein the re-training condition comprises at least one of:
a predetermined number of CRC errors detected within a predetermined time period, and/or
a predetermined number of CRC errors detected after a temperature delta threshold has been met or exceeded.

6. The NVM controller of claim 1, wherein the generated and received CRC codes each comprise one of (i) a fixed-length binary sequence or (ii) a data pattern.

7. The NVM controller of claim 1, wherein the calibration circuit is configured to calibrate the NVM by matching impedance between the NVM controller and the NVM.

8. The NVM controller of claim 1, wherein the calibration circuit is configured to calibrate the NVM based on a duty cycle of a strobe of the controller.

9. The NVM controller of claim 1, wherein the calibration circuit is configured to calibrate the NVM by correcting at least one of a strobe and a phase relationship between data and the strobe, wherein the strobe and the data are provided via the memory interface to the NVM.

10. A non-volatile memory (NVM) controller, configured to communicate with a host and a NVM, comprising:
a processing circuit configured to determine (i) a cyclic redundancy check (CRC) condition indicative of error in the NVM, and (ii) if a re-training condition, based on the CRC condition, has been met;
a CRC circuit operatively coupled to the processing circuit and configured to generate a CRC code when the CRC condition is met, wherein the processing circuit is configured to compare a CRC code received from the NVM controller with the generated CRC code to detect error; and
a calibration circuit operatively coupled to the processing circuit and configured to re-train the NVM if the processing circuit detects error and the re-training condition has been met.

11. The NVM controller of claim 10, wherein the NVM comprises a NAND memory, and the NVM controller is configured to receive the CRC code in response to a read command.

12. The NVM controller of claim 10, wherein the CRC condition comprises at least one of (i) expiration of a predetermined period of time, (ii) a predetermined number of read errors detected, and/or (iii) a temperature delta detected.

13. The NVM controller of claim 10, wherein the re-training condition comprises at least one of:
a predetermined number of CRC errors detected within a predetermined time period, and/or
a predetermined number of CRC errors detected after a temperature delta threshold has been met or exceeded.

14. The NVM controller of claim 10, wherein the generated and received CRC codes each comprise one of (i) a fixed-length binary sequence or (ii) a data pattern.

15. The NVM controller of claim 10, wherein the calibration circuit is configured to calibrate the NVM by matching impedance between the NVM controller and the NVM.

16. The NVM controller of claim 10, wherein the calibration circuit is configured to to calibrate the NVM based on a duty cycle of a strobe of the controller.

17. The NVM controller of claim 10, wherein the calibration circuit is configured to calibrate the NVM by correcting at least one of a strobe and a phase relationship between data and the strobe, wherein the strobe and the data are provided via the memory interface to the NVM.

18. A method of operating a non-volatile memory (NVM) controller, configured to communicate with a host and a NVM, comprising:
determining a cyclic redundancy check (CRC) condition for detecting error in the NVM;
generating a CRC code comprising a fixed-length binary sequence when the CRC condition is determined;
receiving a fixed-length binary sequence CRC code from the NVM in response to a read command from the NVM controller;
comparing the CRC code received from the NVM with the generated CRC code to detect error;
determining if a re-training condition has been met based on detected error in the comparing of the CRC code; and
re-training the NVM if the comparison of the CRC codes is indicative of error and the re-training condition has been met.

19. The method of claim 18, wherein the CRC condition comprises at least one of (i) expiration of a predetermined period of time, and/or (ii) a temperature delta detected.

20. The method of claim 18, wherein the re-training condition comprises at least one of:
a predetermined number of CRC errors detected within a predetermined time period, and/or
a predetermined number of CRC errors detected after a temperature delta threshold has been met or exceeded.

21. The method of claim 18, wherein re-training the NVM comprises calibrating the NVM by matching impedance between the NVM controller and the NVM.

22. The method of claim 21, wherein re-training the NVM comprises calibrating the NVM based on re-training data received from the NVM and correcting at least one of timing and phase of the re-training data received from the NVM.

23. A non-volatile memory (NVM) controller, configured to communicate with a host and a NVM, comprising:
means for determining a cyclic redundancy check (CRC) condition for detecting error in the NVM;
means for generating a CRC code when the CRC condition is determined;
means for comparing a CRC code received from the NVM controller with the generated CRC code to detect error;
means for determining if a re-training condition has been met, based on detected error in the comparing of the CRC code; and
means for re-training the NVM if the means for comparing CRC code detects error and the re-training condition has been met.

* * * * *